United States Patent Office 3,453,334
Patented July 1, 1969

3,453,334
PRODUCTION OF HEPTAFLUOROISOPROPYL-
ALLYL ETHERS
Rudolf G. Griot, Florham Park, N.J., assignor to
Sandoz Inc., Hanover, N.J.
No Drawing. Filed Sept. 26, 1967, Ser. No. 670,796
Int. Cl. C07c 43/12, 41/00
U.S. Cl. 260—614                                    1 Claim

ABSTRACT OF THE DISCLOSURE

The application relates to a new process for the production of heptafluoroisopropyl-allyl ethers which comprises reacting hexafluoroacetone with potassium fluoride in N,N-dimethyl formamide or dimethyl acetamide and contacting the resulting mixture with allyl chloride in the presence of potassium iodide.

---

The invention relates to a new process for the production of polyhalogenated-isopropyl-alkenyl-ethers of the general Formula I

(I)

wherein:

X and X' are each a halogen atom, and
Z is an allyl or vinyl radical.

The compounds of the general Formula I are important intermediates for the production of fluoroalkoxyalkyl silanes, which have outstanding water and/or oil repellant activities and are used for the treatment of fibrous substrates.

The known process for the production of compounds of the type of the present invention has various disadvantages. This process consists of the primary reaction step of reacting a ketone of the general Formula II $$\begin{array}{c} CF_2X \\ | \\ C=O \\ | \\ CF_2X' \end{array}$$
(II)

wherein X and X' have the above mentioned significance in an inert solvent, preferably diglyme i.e. the dimethyl ether of diethylene glycol, with potassium fluoride at relatively low temperatures which necessitate at least in the beginning of the reaction the application of a dry ice-acetone bath. During this reaction, fluorocarbinolate is formed which in the second step is reacted with a bromide of the general Formula III Br—A     (III)

wherein A designates an allyl radical or the radical

—CH₂—CH₂—Y where Y stands for chlorine.

If the second step is carried out using compounds of the general Formula III wherein A designates an allyl radical the compounds of the general Formula I are obtained directly. If compounds of the general Formula III, wherein A stands for —CH₂—CH₂—Y where Y stands for chlorine compounds of the general Formula V

(V)

wherein X, X' and Y have the above mentioned significance, are obtained which are transformed into compounds of the general Formula I by splitting of HY by treatment with e.g. methanolic potassium hydroxide. Disadvantages of this method are the high costs resulting from application of the Dry Ice-acetone bath and the costly bromide of the general Formula III as well as the somewhat difficult separation of the final product.

The present invention provides a process which allows the first reaction step to be carried out at about room temperature, the application of the corresponding chlorides of the general Formula IV Cl—B     (IV)

wherein B signifies an allyl radical, in the second reaction step in place of the bromides of the general Formula III and moreover yields a reaction mixture from which the final product can easily be separated.

The process of the present invention is characterised by the reaction under anhydrous conditions of a compound of the general Formula II at temperatures between 20 and 60° C. with anhydrous potassium fluoride in N,N-dimethylformamide or dimethyl acetamide, followed by the addition of a chloride of the general Formula IV and potassium iodide as a catalyst and heating the reaction mixture to about 70–80° C. for several hours (e.g. 12–20 hours).

A distinctive point in this new process is the application of potassium iodide as catalyst advantageously applied 0.005 m. KI/m. allyl chloride. Without potassium iodide as a catalyst, yields of the compounds of the general Formula I are much lower than with potassium iodide and the separation of the desired final product is more difficult.

Though the boiling point of the compounds of the general Formula II is generally about −30° to +50° C., the reaction with potassium fluoride proceeds at such a velocity that the poly-haloketones can be introduced in the gaseous state with no gas escape taking place at the applied reaction temperature (20–60° C.). A preferable ratio of potassium fluoride to the compound of the general Formula II is 1:1. The separation of the compound of the general Formula I is preferably carried out by distillation at atmospheric pressure. If necessary, the fractions containing the final product can be purified by fractional distillation.

In the following non-limitative example all temperature are expressed in ° C.

Example 144 gm. (2.47 mols) of anhydrous potassium fluoride is suspended in 760 gm. of N,N-dimethyl formamide and the reaction mixture vigorously stirred and 410 g. (2.47 mols) hexafluoro acetone added below the surface via a glass Sparger Inlet within two hours while the temperature is allowed to rise from 20 to 60° C. until a clear solution is obtained. The homogeneous mixture is stirred for an additional hour, allowing the temperature to drop to 30° C. 2 gm. of pulverised potassium iodide and 178 gm. (2.32 mols) allyl chloride are added and the mixture is heated to 75° C. for 12½ hours while stirring. The reaction mixture is then distilled at atmospheric pressure via a 6″ Vigreaux column to obtain 434 gms. of heptafluorisopropylallyl ether, B.P. 60–75° C. (82.7% of theory based on allyl chloride), which can be purified by fractional distillation.

What is claimed is:

1. A process for the production of polyhalogenated-isopropyl-alkenyl-ethers of formula

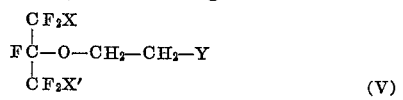

wherein Z is allyl in which the compound of formula $$\begin{array}{c} CF_3 \\ | \\ C=O \\ | \\ CF_3 \end{array}$$

is reacted under anhydrous conditions, with potassium fluoride in N,N-dimethyl formamide or dimethyl acetamide at from 20 to 60° C. and the resulting homogeneous mixture containing fluoro-carbinolate is contacted with a compound of formula Cl—B wherein B sifinifies allyl in the presence of a catalytic amount of potassium iodide at from about 70 to 80° C.

References Cited

UNITED STATES PATENTS 3,331,813   7/1967   Pittman et al. _____ 260—46.5

BERNARD HELFIN, *Primary Examiner.*

H. T. MARS, *Assistant Examiner.*

U.S. Cl. X.R.

260—633